United States Patent
Takahashi

(10) Patent No.: US 7,969,482 B2
(45) Date of Patent: Jun. 28, 2011

(54) IMAGE PICKUP APPARATUS AND CONTROL METHOD THEREOF

(75) Inventor: Kenji Takahashi, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 12/496,578

(22) Filed: Jul. 1, 2009

(65) Prior Publication Data

US 2009/0268052 A1 Oct. 29, 2009

Related U.S. Application Data

(63) Continuation of application No. 11/339,960, filed on Jan. 26, 2006, now Pat. No. 7,557,837.

(30) Foreign Application Priority Data

Jan. 31, 2005 (JP) .................................. 2005-023506

(51) Int. Cl.
*H04N 9/73* (2006.01)
*H04N 5/262* (2006.01)
*H04N 9/27* (2006.01)
*H04N 1/46* (2006.01)
*G03F 3/08* (2006.01)
*G06K 9/00* (2006.01)

(52) U.S. Cl. .................... 348/223.1; 348/239; 348/382; 358/518; 358/514; 358/523; 382/162; 382/167

(58) Field of Classification Search ............... 348/223.1, 348/239, 382; 358/518, 504, 523; 382/162, 382/167
See application file for complete search history.

(56) References Cited

U.S. PATENT DOCUMENTS

| | | | | |
|---|---|---|---|---|
| 5,202,935 A | * | 4/1993 | Kanamori et al. | ............ 382/162 |
| 6,407,774 B1 | * | 6/2002 | Mabuchi et al. | ............ 348/335 |
| 7,212,668 B1 | * | 5/2007 | Luo et al. | ............ 382/165 |

* cited by examiner

*Primary Examiner* — David L Ometz
*Assistant Examiner* — Quang V Le
(74) *Attorney, Agent, or Firm* — Canon U.S.A. Inc., I.P. Division

(57) ABSTRACT

In an image pickup apparatus, image data obtained by an image pickup unit is subjected to predetermined image processing, and an image is displayed on an electronic viewfinder screen based on the image data that has undergone the image processing. A specified color is determined based on color information included in a predetermined region of an image that is currently being displayed on the electronic viewfinder screen, and image processing parameters are produced so that color conversion is carried out on the image while eliminating color components of colors other than the determined specified color.

19 Claims, 12 Drawing Sheets

FIG.5

| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

BAYER ARRAY CCD SIGNALS

FIG.6

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| G1 | G1 | G1 | G1 | G1 | G1 |
|----|----|----|----|----|----|
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |

| G2 | G2 | G2 | G2 | G2 | G2 |
|----|----|----|----|----|----|
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

BAYER INTERPOLATION SIGNALS

| 1/16 | 2/16 | 1/16 |
|------|------|------|
| 2/16 | 4/16 | 2/16 |
| 1/16 | 2/16 | 1/16 | ium that stores therein the control program that are in
IMAGE PICKUP APPARATUS AND CONTROL METHOD THEREOF

CROSS REFERENCE TO RELATED APPLICATIONS

This application is a continuation of U.S. patent application Ser. No. 11/339,960 filed Jan. 26, 2006, which claims priority from Japanese Patent Application No. 2005-023506 filed Jan. 31, 2005, both of which are hereby incorporated by reference herein in their entirety.

BACKGROUND OF THE INVENTION

1. Field of the Invention

The present invention relates to an image pickup apparatus that allows a user to customize a color of an image, and relates to a control method for the image pickup apparatus.

2. Description of the Related Art

In recent years, digital cameras have become very popular. As a result, the needs of users with respect to digital cameras have become more and more diversified.

In order to cope with such a situation, some digital cameras enable a user to customize parameters such as hue, color saturation, lightness, and the like and also enable color reproduction as desired by the user at the time of picking up an image (refer to Japanese Patent Application Laid-Open No. 11-187351). However, it is difficult to show a relationship between variance in the parameters and variance in the color of the image, and thus it is necessary for the user to be highly skilled in performing an appropriate setting of the parameters.

As a proposal related to a method for allowing a user to readily adjust the color of an image, there is a configuration with which color conversion processing for converting a specified source color to a specified target color by specifying a desired source color in an image during a retouching process thereof and specifying a color desired as the target color for conversion is carried out (refer to Japanese Patent Application Laid-Open No. 2004-129226). However, with this configuration, it is necessary for the user to specify the target color with respect to the source color, and, therefore, it is difficult to readily produce an image with a special image effect in an image pickup apparatus in accordance with an operation for picking up an image.

SUMMARY OF THE INVENTION

The present invention is provided in consideration of the foregoing, and the present invention is directed to an image pickup apparatus having a restricted user interface that is configured to enable a special effect to be explicitly, definitely, and readily set by a user with respect to an image to be picked up, and also to enable performance of the setting to be implemented with a simple operation at the time of picking up an image by the user.

In one aspect of the present invention, an image pickup apparatus includes an image pickup unit, an image processing unit configured to process an image signal obtained by the image pickup unit, a recording unit configured to record the image signal that is outputted from the image processing unit, a display unit configured to display on an electronic viewfinder screen an image based on the image signal that is picked up by the image pickup unit and outputted from the image processing unit, a color determination unit configured to determine a color value based on color information included in a predetermined region of an image that is being displayed on the electronic viewfinder screen, and a color conversion parameter determination unit configured to determine color conversion parameters for leaving the color value determined by the color determination unit and converting a color component value included in the image signal other than the color value into a predetermined color value, wherein the image signal is processed by the image processing unit based on the parameters determined by the color conversion parameter determination unit and the processed image is displayed by the display unit.

With this configuration, a user can freely, explicitly, and readily set a specified color even with a restricted user interface of the image pickup apparatus, and further, it is possible, in picking up an image, to obtain an image that is subjected to a special effect such that a color conversion by which a color specified by the user is left and color component values of colors other than the specified color are converted into predetermined color component values, with a simple operation of the user interface.

In another aspect of the present invention, a method of controlling the image pickup apparatus, a control program for controlling of the image pickup apparatus, and a storage medium that stores therein the control program that are in correspondence with the image pickup apparatus are provided.

Further features of the present invention will become apparent from the following detailed description of exemplary embodiments with reference to the attached drawings.

BRIEF DESCRIPTION OF THE DRAWINGS

The invention will now be described, by way of example only, with reference to the accompanying diagrammatic drawings, in which:

FIG. 5 is a conceptual diagram that shows a color array of a CCD in the image pickup apparatus according to an embodiment of the present invention.

FIG. 6 is a conceptual diagram that shows how data after a CCD signal is interpolated in the image pickup apparatus according to an embodiment of the present invention.

DETAILED DESCRIPTION OF THE EMBODIMENTS

Exemplary embodiments of the present invention will be described in detail in accordance with the accompanying drawings.

First Embodiment

Figure 1:
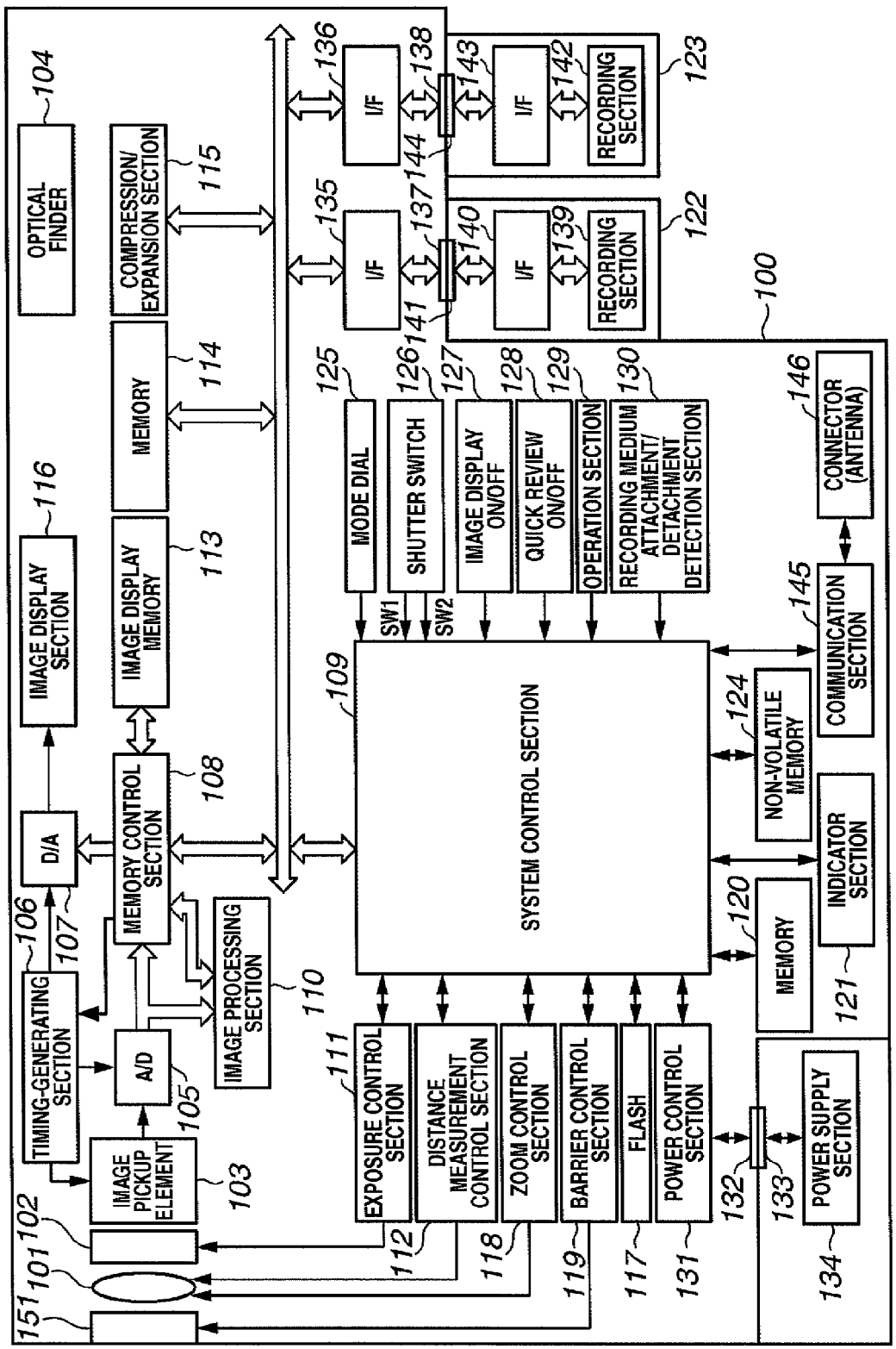
FIG. 1 is a block diagram showing a configuration of an image pickup apparatus according to an embodiment of the present invention.

FIG. 1 is a block diagram showing an example of a configuration of an image pickup apparatus 100 (in this embodiment, a digital camera) according to a first embodiment of the present invention. An image in real space is formed on an image pickup element 103 that converts an optical image into an electric signal, via an image pickup lens 101 and a shutter 102 that is provided with a diaphragm function. An A/D conversion section 105 converts an analog signal that is outputted from the image pickup element 103 into a digital signal. A timing-generating section 106 is controlled by a memory control section 108 and a system control section 109, and supplies a control signal and clock signals to the image pickup element 103, the A/D conversion section 105, and a D/A conversion section 107.

An image processing section 110 carries out a given process, such as image interpolation processing and color conversion processing, on data from the A/D conversion section 105 or data from the memory control section 108. The image processing section 110 also carries out computation processing using taken image data. The system control section 109 controls an exposure control section 111 and a distance measurement control section 112 on the basis of the result of the computation by the image processing section 110. In addition, the system control section 109 carries out through-the-lens (TTL) processing such as an automatic focus (AF) processing, automatic exposure (AE) processing, and preliminary emission of flash (EF) processing. Further, the image processing section 110 carries out computation processing using taken image data, and also carries out TTL-type automatic white balance (AWB) processing on the basis of the result of the computation.

The memory control section 108 controls the A/D conversion section 105, the timing-generating section 106, the D/A conversion section 107, the image processing section 110, an image display memory 113, a memory 114, and a compression/expansion section 115. The data outputted from the A/D conversion section 105 is written into the image display memory 113 or the memory 114 via the image processing section 110 and the memory control section 108, or via the memory control section 108 only. Note that in writing image data into the image display memory 113, the image data is written while being thinned in accordance with the resolution of a display device of the image display section 116. The image data used for display that is written into the image display memory 113 is converted into an analog signal for image display via the D/A conversion section 107, and is then displayed by the image display section 116. The image display section 116 is configured by a thin-film transistor liquid crystal display (TFTLCD) and the like. Note that by sequentially displaying data of taken images by using the image display section 116, it is possible to implement a so-called electronic viewfinder function. The image display section 116 is capable of arbitrarily turning on or off a display in accordance with an instruction from the system control section 109. If the display is turned off, power consumption of the image pickup apparatus 100 can be significantly reduced.

The memory 114 is a memory for storing therein still images and moving images that are picked up. The memory 114 has storage capacity large enough to store a given number of still images and a given length of time of moving images. Thereby it is possible to write a large number of images at a high speed into the memory 114 even in the case of continuous shooting in which a plurality of still images are continuously taken and also in the case of panoramic shooting. The memory 114 can also be used as a work area of the system control section 109.

The compression/expansion section 115 compresses and expands image data by using an adaptive discrete cosine transform (ADCT) or the like. The compression/expansion section 115 reads an image stored in the memory 114, compresses or expands the read image, and writes data of the processed image into the memory 114.

The exposure control section 111 controls the shutter 102 having a diaphragm function. The exposure control section 111 is also in coordination with the flash 117 to effect a flash light intensity control function. The distance measurement control section 112 controls focusing of the image pickup lens 101. A zoom control section 118 controls zooming of the image pickup lens 101. A barrier control section 119 controls an operation of a protection section 151. The protection section 151 is a barrier that prevents an image pickup section from being smeared or damaged by covering the image pickup section of the image pickup apparatus 100 that includes the image pickup lens 101, the shutter 102, and the image pickup element 103. The protection section 151 is primarily intended, in general, to protect the image pickup lens 101. The flash 117 is provided with an AF auxiliary light projecting function and a flash light intensity control function. The exposure control section 111 and the distance measurement control section 112 are controlled by the TTL processing. That is, the system control section 109 controls the exposure control section 111 and the distance measurement control section 112 on the basis of the result of computation obtained from taken image data by the image processing section 110. The system control section 109 controls the entirety of the image pickup apparatus 100. The memory 120 stores therein constants, variables, programs, and the like for operation of the system control section 109. Programs described in FIGS. 4, 10, 11 and 14 are stored in memory 120, and they are executed by image processing section 110 and/or system control section 109.

The indicator section 121 is a liquid crystal display (LCD), a light-emitting diode (LED), or the like that indicates a state of operation, a message, and the like with characters or images, in accordance with execution of a program by the system control section 109. Note that the indicator section 121 may include a speaker, a piezoelectric buzzer (sound production device), and the like capable of outputting a voice, a buzzer sound, and the like that expresses or represents the state of operation or a part of the message. Further, the indicator section 121 can be disposed at one position or two or more positions that are easy to look at in the vicinity of an operation section of the image pickup apparatus 100. Some functions and mechanisms of the indicator section 121 may be installed within an optical finder 104.

Contents displayed on the indicator section 121 to be displayed on the LCD and the like include a single/continuous shooting display, a self-timer display, a compression ratio display, a recording pixel number display, a recording image number display, a remaining photographable image number display, a shutter speed display, an aperture value display, an exposure compensation display, a flash display, a red-eye reduction display, a macrophotography display, a buzzer setting display, a clock battery remaining quantity display, a battery remaining quantity display, an error display, an information display by multiple-digit, a display of attachment or detachment of a recording medium 122 and a recording medium 123, a communication I/F operation display, a date and time display, and the like. Further, contents displayed on the indicator section 121 to be displayed within the optical finder 104 include a focusing display, a camera-shake warning display, a flash charge display, a shutter speed display, an aperture value display, a exposure compensation display, and the like.

The non-volatile memory 124 can be a memory that can be electrically erased and recorded. For the non-volatile memory 124, an EEPROM or the like, for example, is used. Reference numerals 125, 126, 127, 128, and 129 respectively denote an operation section for inputting various kinds of operational instructions to the system control section 109. The operation sections are configured by any one of, or a combination of any ones of: a switch, a dial, a touch screen, pointing by detection of a line of sight, a speech recognition device, and the like. The operation sections are specifically explained as described below.

A mode dial switch 125 is a switch for switching and setting each function mode, such as power off, an automatic photographing mode, a manual photographing mode, a panoramic photographing mode, a reproduction mode, a multiscreen reproduction/erasure mode, a PC connection mode, and the like. A shutter switch 126 outputs a signal SW1 when a shutter button (reference numeral 203 in FIG. 2) is operated (when the shutter button is half-pressed) and outputs a signal SW2 when the operation of the shutter button is completed (when the shutter button is fully pressed). Start of operation of processing, such as automatic focus (AF) processing, automatic exposure (AE) processing, automatic white balance (AWB) processing, and preliminary emission of flash (EF) processing, is instructed by the signal SW1. The start of a series of photographing processing operations is instructed by the signal SW2. In the photographing processing, a series of processing operations as described below is carried out. That is, the signal read from the image pickup element 103 is converted into a digital signal (subjected to exposure processing) by the A/D conversion section 105 and the converted signal is written into the memory 114 via the memory control section 108 as image data (RAW data). Then, the signal that is exposure processed is subjected to a computation processing (developing processing) by the image processing section 110 and the memory control section 108, and is then written into the memory 114. Further, the image data written into the memory 114 is read from the memory 114, and is compressed by the compression/expansion section 115, and then is written onto the recording medium 122 or the recording medium 123 (recording processing).

An image display on/off switch 127 switches between and sets on/off states of the image display section 116. With this function, in taking an image by using the optical finder 104, it is possible to cut off power supply to the image display section 116 configured by a TFTLCD and the like, and thereby it is possible to effect power saving. A quick review on/off switch 128 sets on/off of a quick review function that automatically reproduces photographed image data immediately after the image is photographed. Note that the quick review on/off switch 128 is provided with a function for setting the quick review function for quickly reviewing a photographed image in a case where the image display section 116 is turned off, namely, a function for enabling reviewing a photographed image even in a case where image display is off).

An operation section 129 is provided with various kinds of buttons, a touch screen, and the like, and functions as an instruction button for performing various kinds of operations, by one single switch or by a combination of a plurality of switches. For the operational instruction button like this, there are, for example, a menu button, a setting button, a macro button, a multiscreen reproduction page-turning button, a flash setting button, a single-shooting/continuous-shooting/self-timer switching button, a menu shifting "+" button, a menu shifting "−" button, a reproduction image shifting "+" button, a reproduction image shifting "−" button, a photographing image quality selection button, an exposure compensation button, a date/time setting button, an image erasure button, an image erasure cancel button, and the like.

A power control section 131 is configured by a battery detection circuit, a DC-DC converter, a switch circuit for switching between blocks to be energized, and the like. The power control section 131 determines whether a battery cell is mounted or not, what type the mounted battery cell is, and how much charge is remaining in the battery cell. The power control section 131 also controls the DC-DC converter in accordance with the result of the determination and the instruction from the system control section 109. Further, the power control section 131 supplies necessary voltage to each section, including a recording medium, for a necessary period of time. A power supply section 134 is configured by a primary battery such as an alkaline battery, a lithium cell, and the like, a secondary battery such as a NiCd battery, a NiMH battery, a Li battery, and the like, an AC adapter, and the like. The power supply section 134 is connected to the power control section 131 via connectors 132 and 133.

An interface 135 and an interface 136 respectively connect recording mediums 122 and 123, such as a memory card or a hard disk, with a bus in the image pickup apparatus 100. The interface 135 and the interface 136 are connected to the recording mediums 122 and 123 via connectors 137 and 138, respectively. The recording medium attachment/detachment detection section 130 determines whether or not the recording medium 122 and/or the recording medium 123 is connected to the connector 137 and/or the connector 138.

Note that in this embodiment, an explanation is made as to a case where two systems of interfaces and connectors to which a recording medium is mounted or connected are provided. However, the configuration of this embodiment may be such that the number of interfaces and connectors to which a recording medium is mounted or connected may be either one or more than one. Further, the configuration may be such that interfaces and connectors of different standards are provided in combination. For the interface and the connector, those in compliance with the standard of a PCMCIA card, a CompactFlash (CF) (registered trademark) card, and the like may be used.

Further, in a case where the interface 135, the interface 136, the connector 137, and the connector 138 that are in compliance with the standard of the PCMCIA card, the CompactFlash (CF) (registered trademark) card, and the like are used, the configuration may be such that image data and management information adjunct to the image data may be sent/transferred and received between the image pickup apparatus of this embodiment and other computers and/or a peripheral device such as a printer and the like, by connecting to the image pickup apparatus of this embodiment various kinds of communication cards of standards, such as a LAN card, a modem card, a USB card, an IEEE 1394 card, a P1284 card, a SCSI card, a communication card for PHS, and the like.

The optical finder 104 enables photographing by using an optical finder only, without using an electronic viewfinder function by the image display section 116. Besides, as described above, within the optical finder 104, there is provided a certain function of the indicator section 121, such as, for example, a focusing display, a camera-shake warning display, a flash charge display, a shutter speed display, an aperture value display, an exposure compensation display, and the like.

The communication section 145 is provided with various communication functions in compliance with a standard, such as RS232C, USB, IEEE1394, P1284, SCSI, modem, LAN, wireless communication, and the like. The connector 146 is a connector for connecting the image pickup apparatus 100 to other devices via the communication section 145. Otherwise, in the case of wireless communication, the connector 146 is an antenna.

The recording medium 122 and the recording medium 123 are provided, respectively, with recording sections 139 and 142, such as a semiconductor memory or a magnetic disc, interfaces 140 and 143 for use with the image pickup apparatus 100, and connectors 141 and 144 for connection to the image pickup apparatus 100.

Figure 2:
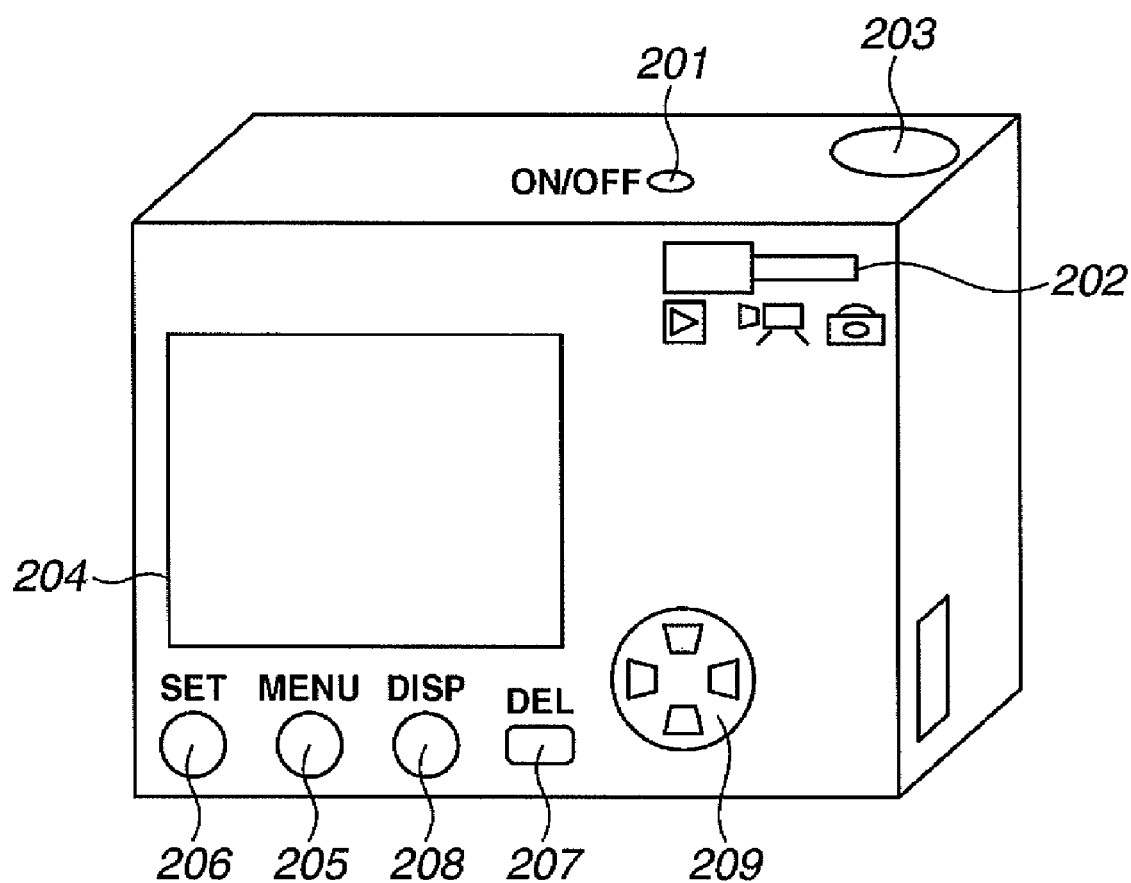
FIG. 2 is a perspective view showing an external appearance of the image pickup apparatus according to the embodiment of the present invention.

FIG. 2 is a perspective view of the image pickup apparatus (digital camera) 100 of this embodiment. A power switch 201 is a button for turning on and off the power supply. Reference numeral 202 and reference numerals 205 through 209 denote elements constituting one part of the operation section 129 as described above. A mode switching lever 202 is a lever for switching and setting each function mode, such as a photographing mode, a reproduction mode, a moving image photographing mode, a still image photographing mode, and the like. A shutter button 203 is a button that functions as the shutter switch 126 as described above. An LCD 204 configures one part of the image display section 116 as described above and functions as an electronic viewfinder, and also displays a screen obtained by reproducing still images and/or moving images. A menu button 205 is a switch that turns on and off a menu screen for changing photographing parameters and the setting of the camera. A setting button 206 is a button used for selecting and determining a menu displayed on the menu screen by the operation of the menu button 205. A deletion button 207 is a button for designating the deletion of an image. A display button 208 configures the image display on/off switch 127, and is a button for switching between display and nondisplay on the LCD 204. A cross-shaped button 209 is a button that can be used for shifting between items displayed on the menu screen by using the cross-shaped upper/lower/left/right buttons and for feeding an image by pressing the left/right buttons in a reproduction mode.

Figure 3:
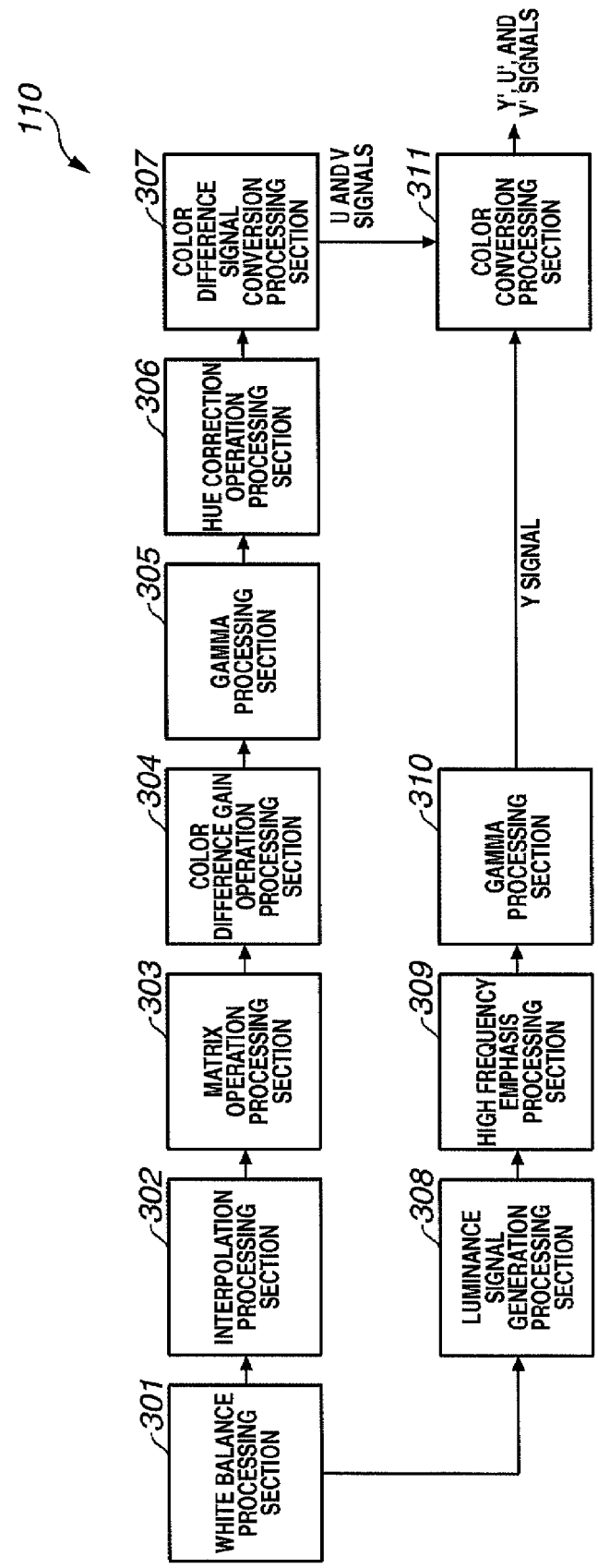
FIG. 3 is a block diagram showing a method of image processing according to an embodiment of the present invention.

FIG. 3 is a block diagram that explains processing of the image processing section 110 in the digital camera 100 according to this embodiment. Note that parameters as used for each processing (parameters for a matrix operation and a three-dimensional lookup table) are stored in the memory 120, and are read when required by the image processing section 110. A CCD digital signal subjected to A/D conversion by the A/D conversion section 105 is then subjected to white balance processing by a white balance processing section 301. Although no explanation is made as to the white balance processing here, the white balance processing can be carried out by using a method as described in Japanese Patent Application Laid-Open No. 2003-244723, for example. The CCD digital signal that has been subjected to the white balance processing is supplied to an interpolation processing section 302. Note that the image pickup element 103 of this embodiment has a Bayer array color filter as shown in FIG. 5. Accordingly, in the interpolation processing section 302, the processing for converting Bayer array CCD data shown in FIG. 5 into interpolated data of R, G1, G2, and B as shown in FIG. 6 is carried out. The interpolated CCD digital signals are inputted to a matrix operation processing section 303. In the matrix operation processing section 303, a 4×3 matrix operation as expressed by equation (1) is performed to obtain values Rm, Gm, and Bm.

$$\begin{vmatrix} Rm \\ Gm \\ Bm \end{vmatrix} = \begin{vmatrix} M11 & M21 & M31 & M41 \\ M12 & M22 & M32 & M42 \\ M13 & M23 & M33 & M43 \end{vmatrix} \begin{vmatrix} R \\ G1 \\ G2 \\ B \end{vmatrix} \quad (1)$$

The CCD digital signals that have undergone the matrix operation processing are then amplified by a gain by a color difference gain operation processing section 304, and thereby converted into color-difference signals. In other words, the signals Rm, Gm, and Bm are converted into Y, Cr, and Cb signals in accordance with the computation as expressed by equation (2) below. Then, the resulting Cr and Cb signals are amplified by a gain in accordance with the arithmetic operation processing as expressed by equation (3) below. After that, by the computation as expressed by equation (4) (inverse matrix operation of equation (2)), the signals are converted into Rg, Gg, and Bg signals.

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rm \\ Gm \\ Bm \end{vmatrix} \quad (2)$$

$$Cr^* = G1 \times Cr \quad (3)$$
$$Cb^* = G1 \times Cb$$

$$\begin{vmatrix} Rg \\ Gg \\ Bg \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr^* \\ Cb^* \end{vmatrix} \quad (4)$$

The CCD digital signals that have undergone a color difference gain operation processing are sent to a gamma processing section 305. The gamma processing section 305 performs gamma conversion processing of the CCD digital signals using equations (5) to (7) below:

$$Rt = \text{GammaTable}[Rg] \quad (5)$$

$$Gt = \text{GammaTable}[Gg] \quad (6)$$

$$Bt = \text{GammaTable}[Bg] \quad (7)$$

where GammaTable represents a one-dimensional lookup table.

The CCD digital signals that are subjected to the gamma conversion processing are then sent to a hue correction operation processing section 306. The hue correction operation processing section 306 converts Rt, Gt, and Bt signals into Y, Cr, and Cb signals using equation (8) as described below.

Further, the hue correction operation processing section 306 corrects Cr and Cb signals using equation (9), and after that, converts the Y, Cr', and Cb' signals into Rh, Gh, and Bh signals using equation (10) (inverse matrix operation of equation (8)).

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rt \\ Gt \\ Bt \end{vmatrix} \quad (8)$$

$$\begin{vmatrix} Cr^* \\ Cb^* \end{vmatrix} = \begin{vmatrix} H11 & H21 \\ H12 & H22 \end{vmatrix} \begin{vmatrix} Cr \\ Cb \end{vmatrix} \quad (9)$$

$$\begin{vmatrix} Rh \\ Gh \\ Bh \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr^* \\ Cb^* \end{vmatrix} \quad (10)$$

The CCD digital signals that have been subjected to the processing by the hue correction operation processing section 306 are then sent to a color difference signal conversion processing section 307. The color difference signal conversion processing section 307 generates U and V signals from Rh, Gh, and Bh signals by computation as expressed by equation (11).

$$\begin{vmatrix} U \\ V \end{vmatrix} = \begin{vmatrix} -0.169 & -0.333 & 0.502 \\ 0.499 & -0.421 & -0.078 \end{vmatrix} \begin{vmatrix} Rh \\ Gh \\ Bh \end{vmatrix} \quad (11)$$

Figures 7, 8:
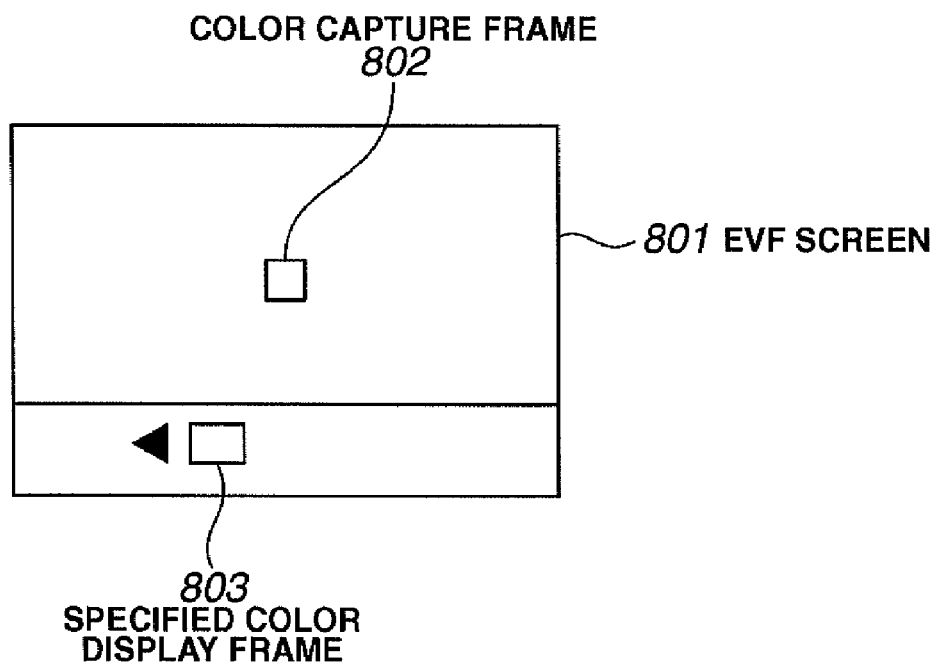
FIG. 7 is a view that shows a filter as used for luminance signal generation processing according to an embodiment of the present invention.
FIG. 8 is a view showing an example of an electronic viewfinder (EVF) screen in a specified color capturing mode according to an embodiment of the present invention.

Meanwhile, the CCD digital signals subjected to the white balance processing by the white balance processing section 301 are also supplied to a luminance signal generation processing section 308. The luminance signal generation processing section 308 converts the CCD digital signals into a luminance signal. For example, a luminance signal in the case of a primary color filter as shown in FIG. 5 is generated by making both R and B signals zero and by carrying out a two-dimensional filtering processing having coefficients as shown in FIG. 7. Note that, in the case of a complementary color filter, a signal that is subjected to the two-dimensional filtering processing having coefficients as shown in FIG. 7 is used as it is as a luminance signal. The luminance signal generated by the luminance signal generation processing section 308 is then subjected to edge enhancement processing by a high frequency emphasis processing section 309, and is further subjected to gamma conversion processing by a gamma processing section 310, so that a Y signal is generated.

The Y signal outputted from the gamma processing section 310 and the U and V signals outputted from the color difference signal conversion processing section 307 are converted into Y', U', and V' signals, respectively, by a color conversion processing section 311. In the color conversion processing section 311, a conversion processing using a three-dimensional lookup table is carried out. With regard to this processing, an explanation is made in detail below.

Figure 12:
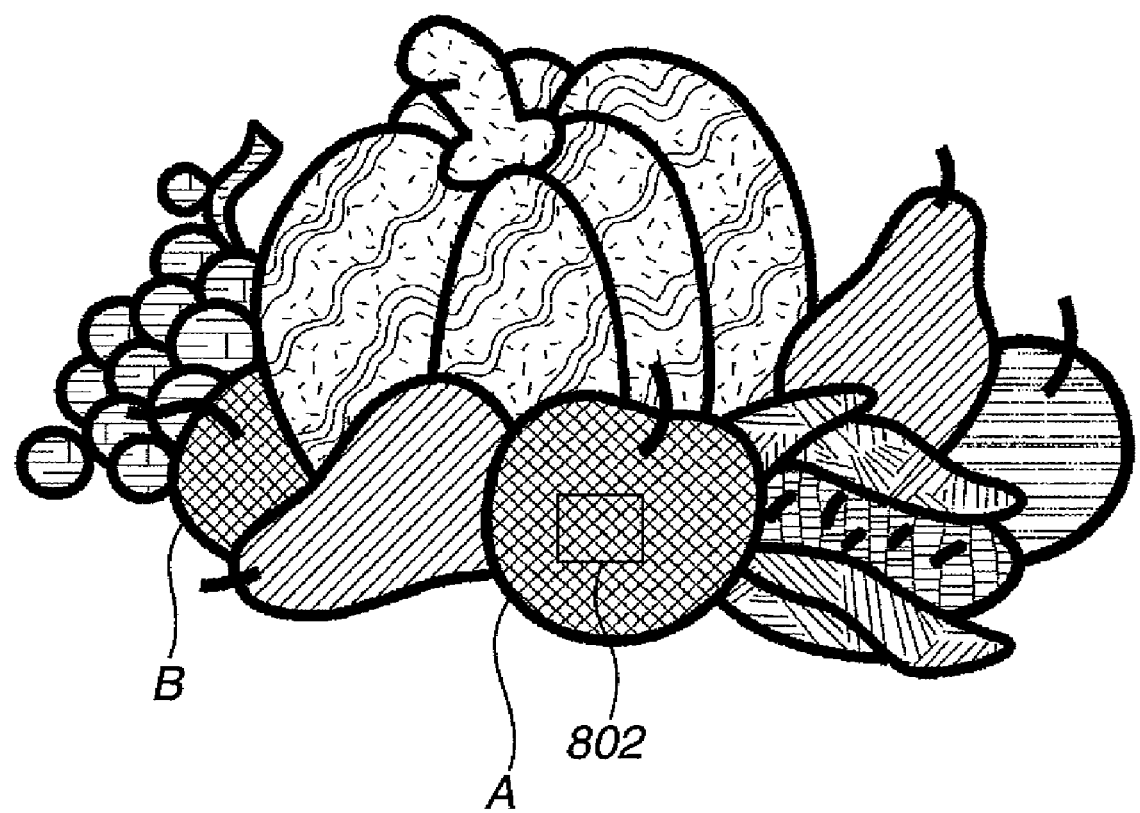
FIG. 12 shows an image displayed on an EVF screen when a subject is being photographed according to an embodiment of the present invention.
Figure 13:
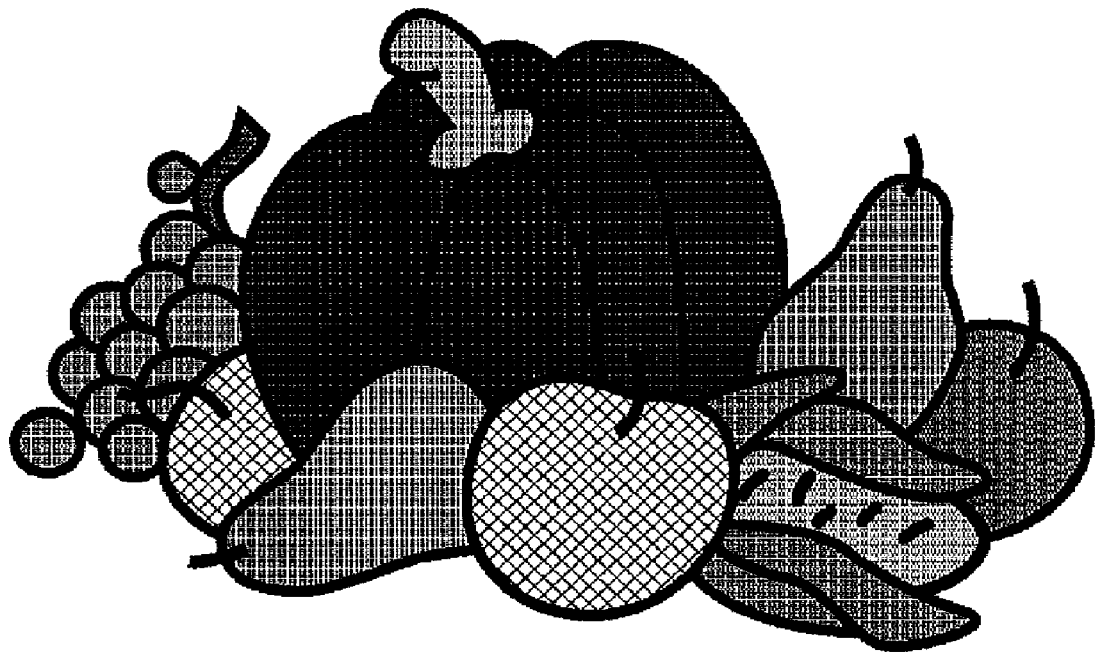
FIG. 13 is a view showing an image after being subjected to the processing carried out in the color leaving mode according to an embodiment of the present invention.

The digital camera (image pickup apparatus 100) of this embodiment is provided with an image pickup mode in which a color conversion can be performed while leaving an arbitrary color specified by a user (hereinafter, this image pickup mode is referred to as "color leaving mode"). In the color leaving mode, an electronic viewfinder (EVF) screen 801 as shown in FIG. 8 is displayed on the LCD 204, a given operation is performed so that a desired color is included in a color capture frame 802 within a photographed image being displayed in real time, and thereby the color of an image within the color capture frame 802 is determined as a specified color. More specifically, for example, if the user specifies an object A that is present in a central portion of the image by the color capture frame 802 as shown in FIG. 12, the color of the object A is determined as a specified color. Here, in this case, the object A and an object B are in the same color. Thus, a lookup table of the color conversion processing section 311 is set so that only the determined specified color is left and the other color components are erased. As a result, a displayed image displayed on the EVF screen 801 thereafter and a photographed image recorded by operation of the shutter button 203 are subjected to conversion so as to be a chromatically colored by eliminating the color components of objects other than the objects A and B and leaving the color of the objects A and B only that is colored with the specified color, as shown in FIG. 13. Hereinbelow, the color leaving mode according to this embodiment is explained in detail.

Figure 9:
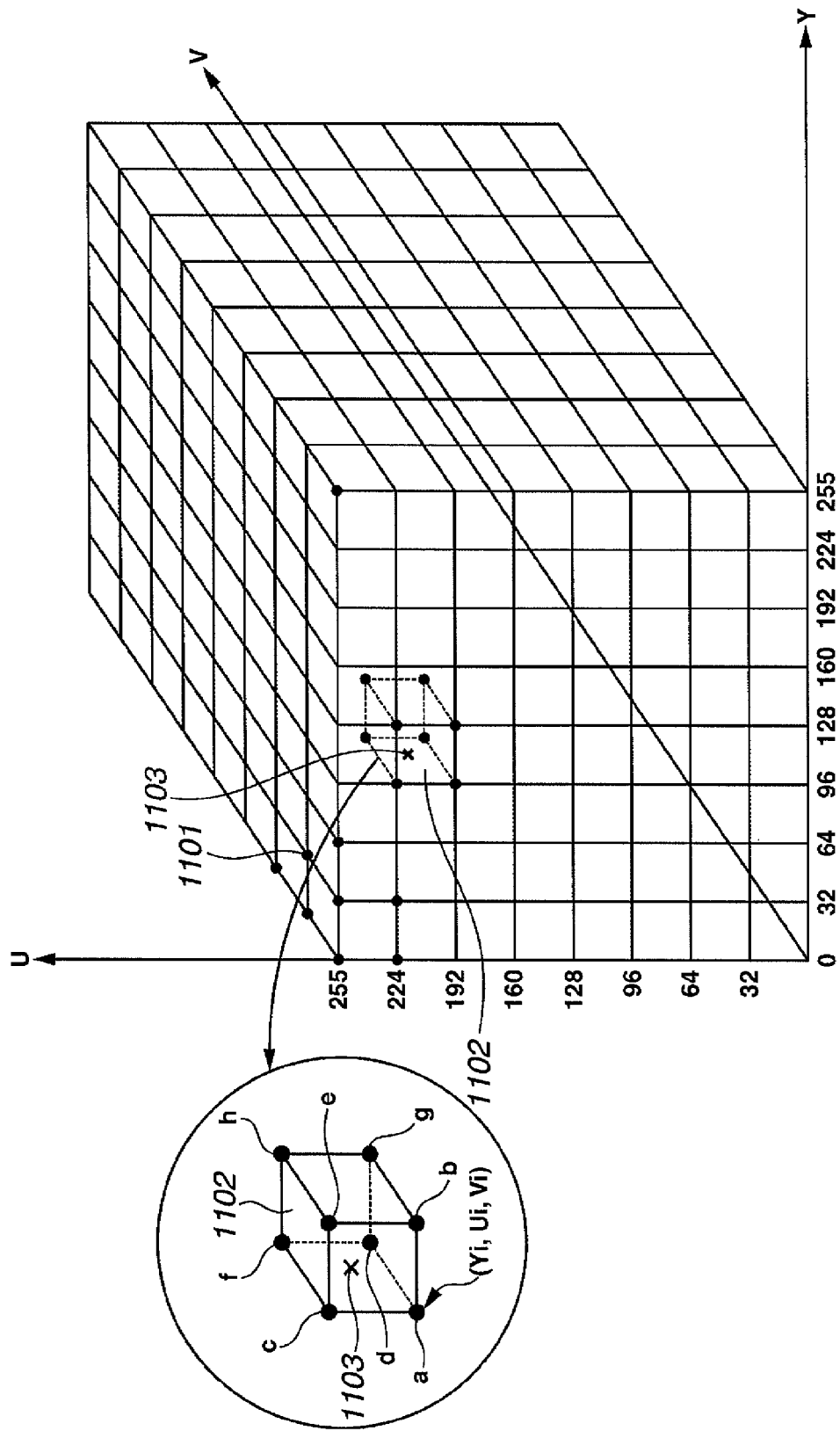
FIG. 9 is a view that shows a method of color conversion processing using a three-dimensional lookup table according to an embodiment of the present invention.

First, an explanation is made as to a color leaving processing in the color leaving mode. In the color conversion processing section 311, YUV signals are converted into Y'U'V' signals by the three-dimensional lookup table. In this embodiment, in order to reduce a capacity of the three-dimensional lookup table, a signal value range between a minimum value and a maximum value of each of the Y signal, U signal, and V signal is divided into eight parts to prepare a list of Y, U, and V signals (lookup table) corresponding to 9×9×9=729 three-dimensional representative lattice points. Y, U, and V signals other than the representative lattice points are obtained by interpolation. FIG. 9 is a view conceptually showing the three-dimensional lookup table according to this embodiment. Each lattice point is assigned with the values of the converted Y, U, and V signals. For example, a lattice point 1101 is a point having values (32, 255, 32), and if there arises no difference after conversion of the signal, then the lattice point 1101 is assigned with the values (32, 255, 32). Alternatively, if the lattice point 1101 is a point having values (32, 230, 28) after the conversion of the signal, then the lattice point 1101 is assigned with the values (32, 230, 28).

For example, the values of Y, U, and V signals of a point 1103 that is present within a cubic lattice 1102 in FIG. 9 are computed by interpolation arithmetic operation from the Y, U, and V values of each of the lattice points "a" through "h", each of which corresponds to each of the vertices of the cubic lattice 1102. The interpolation arithmetic operation is performed using equations (12) through (14) as described below. Here, in the equations (12) through (14), let Y, U, and V be the input Y, U, and V signals, and let Yout (Y, U, V), Uout (Y, U, V), and Vout (Y, U, V) be the output Y, U, and V signals. Further, let Yi, Ui, and Vi be the signals at a representative lattice point ("a" in FIG. 9) having values which are smaller than and closest to the signal values of the input Y, U, and V signals, and let Yout (Yi, Ui, Vi), Uout (Yi, Ui, Vi), and Vout (Yi, Ui, Vi) be the representative lattice point output signals. Further, let Step (in this embodiment, 32) be the step width of the representative lattice points. Thus, a lattice point "b", for example, is assigned with values (Yi+Step, Ui, Vi), and a lattice point "c" is assigned with values (Yi, Ui+Step, Vi).

$$Y = Yi + Yf$$

$$U = Ui + Uf$$

$$V = Vi + Vf$$

Yout(Y,U,V)=Yout(Yi+Yf,Ui+Uf,Vi+Vf)=(Yout(Yi,Ui,Vi)×(Step−Yf)×(Step−Uf)×(Step−Vf)+Yout(Yi+

$$\text{Step},Ui,Vi)\times(Yf)\times(\text{Step}-Uf)\times(\text{Step}-Vf)+Y\text{out}(Yi,$$
$$Ui+\text{Step},Vi)\times(\text{Step}-Yf)\times(Uf)\times(\text{Step}-Vf)+Y\text{out}(Yi,$$
$$Ui,Vi+\text{Step})\times(\text{Step}-Yf)\times(\text{Step}-Uf)\times(Vf)+Y\text{out}(Yi+$$
$$\text{Step},Ui+\text{Step},Vi)\times(Yf)\times(Uf)\times(\text{Step}-Vf)+Y\text{out}(Yi+$$
$$\text{Step},Ui,Vi+\text{Step})\times(Yf)\times(\text{Step}-Uf)\times(Vf)+Y\text{out}(Yi,$$
$$Ui+\text{Step},Vi+\text{Step})\times(\text{Step}-Yf)\times(Uf)\times(Vf)+Y\text{out}(Yi+$$
$$\text{Step},Ui+\text{Step},Vi+\text{Step})\times(Yf)\times(Uf)\times(Vf)/(\text{Step}\times\text{Step}\times\text{Step}) \quad (12)$$

$$U\text{out}(Y,U,V)=U\text{out}(Yi+Yf,Ui+Uf,Vi+Vf)=(U\text{out}(Yi,Ui,Vi)\times(\text{Step}-Yf)\times(\text{Step}-Uf)\times(\text{Step}-Vf)+U\text{out}(Yi+\text{Step},Ui,Vi)\times(Yf)\times(\text{Step}-Uf)\times(\text{Step}-Vf)+U\text{out}(Yi,Ui+\text{Step},Vi)\times(\text{Step}-Yf)\times(Uf)\times(\text{Step}-Vf)+U\text{out}(Yi,Ui,Vi+\text{Step})\times(\text{Step}-Yf)\times(\text{Step}-Uf)\times(Vf)+U\text{out}(Yi+\text{Step},Ui+\text{Step},Vi)\times(Yf)\times(Uf)\times(\text{Step}-Vf)+U\text{out}(Yi+\text{Step},Ui,Vi+\text{Step})\times(Yf)\times(\text{Step}-Uf)\times(Vf)+U\text{out}(Yi,Ui+\text{Step},Vi+\text{Step})\times(\text{Step}-Yf)\times(Uf)\times(Vf)+U\text{out}(Yi+\text{Step},Ui+\text{Step},Vi+\text{Step})\times(Yf)\times(Uf)\times(Vf)/(\text{Step}\times\text{Step}\times\text{Step}) \quad (13)$$

$$V\text{out}(Y,U,V)=V\text{out}(Yi+Yf,Ui+Uf,Vi+Vf)=(V\text{out}(Yi,Ui,Vi)\times(\text{Step}-Yf)\times(\text{Step}-Uf)\times(\text{Step}-Vf)+V\text{out}(Yi+\text{Step},Ui,Vi)\times(Yf)\times(\text{Step}-Uf)\times(\text{Step}-Vf)+V\text{out}(Yi,Ui+\text{Step},Vi)\times(\text{Step}-Yf)\times(Uf)\times(\text{Step}-Vf)+V\text{out}(Yi,Ui,Vi+\text{Step})\times(\text{Step}-Yf)\times(\text{Step}-Uf)\times(Vf)+V\text{out}(Yi+\text{Step},Ui+\text{Step},Vi)\times(Yf)\times(Uf)\times(\text{Step}-Vf)+V\text{out}(Yi+\text{Step},Ui,Vi+\text{Step})\times(Yf)\times(\text{Step}-Uf)\times(Vf)+V\text{out}(Yi,Ui+\text{Step},Vi+\text{Step})\times(\text{Step}-Yf)\times(Uf)\times(Vf)+V\text{out}(Yi+\text{Step},Ui+\text{Step},Vi+\text{Step})\times(Yf)\times(Uf)\times(Vf)/(\text{Step}\times\text{Step}\times\text{Step}) \quad (14)$$

Hereinbelow, the equation for the lookup table conversion and the interpolation arithmetic operation equation of the equations (12), (13), and (14) are simply expressed as equation (15) as described below. Here, in the equation (15), Y, U, and V express the input signal values, LUT denotes a 9×9×9 lookup table as shown in FIG. 9, and Yout, Uout, and Vout express the results of the lookup table conversion and the interpolation arithmetic operation (Y', U', and V' in FIG. 3). That is, the color conversion processing section 311 carries out the conversion processing as expressed by equation (15) as described below.

$$(Y\text{out},U\text{out},V\text{out})=\text{LUT}[(Y,U,V)] \quad (15)$$

As described above, when a specified color is determined in the color leaving mode, a cubic lattice that includes the specified color therein is determined, and then the values of each of the lattice points that form the cubic lattice are changed, without changing the Y, U, and V signal values of a coordinate position of the specified color, so that the U and V signals of other coordinate positions are set to be zero. For example, if the specified color determined by the processing as described with reference to FIG. 9 has Y, U, and V values of the point 1103, while the values of the lattice points "a" through "h" of the cubic lattice 1102 are not changed, the values of the representative points other than the lattice points "a" through "h" of the cubic lattice 1102 are changed so that the U and V signal values are set to be zero, which indicates an achromatic color, without changing the Y signal. That is, all the colors other than the specified color are changed into a gray scale. Then, in the color conversion processing section 311, the color conversion processing is performed by using the three-dimensional lookup table that has undergone the change of the values. Note that, in the following discussion, the change of the values of the lattice points as described above is referred to as "setting of parameters".

As described above, lattice point data of the three-dimensional lookup table is determined in accordance with the specified color to perform the color conversion, and thereby it is possible to readily perform a color setting as favored and desired by the user on an image to be reproduced. In addition, in the color conversion processing, only the representative lattice points in the vicinity of the color that is desired to be changed are changed in the three-dimensional lookup table. Therefore, it is possible to readily implement the conversion such that the color of one part of an image is left and the color signals of the other colors of the image are eliminated, with a high speed operation. That is, the parameters that are utilized by the matrix operation processing section 303, the color difference gain operation processing section 304, the gamma processing section 305, the hue correction operation processing section 306, and the like are not changed, and thereby it is possible to leave only the desired color (a region of the color including the specified color).

Figure 4:
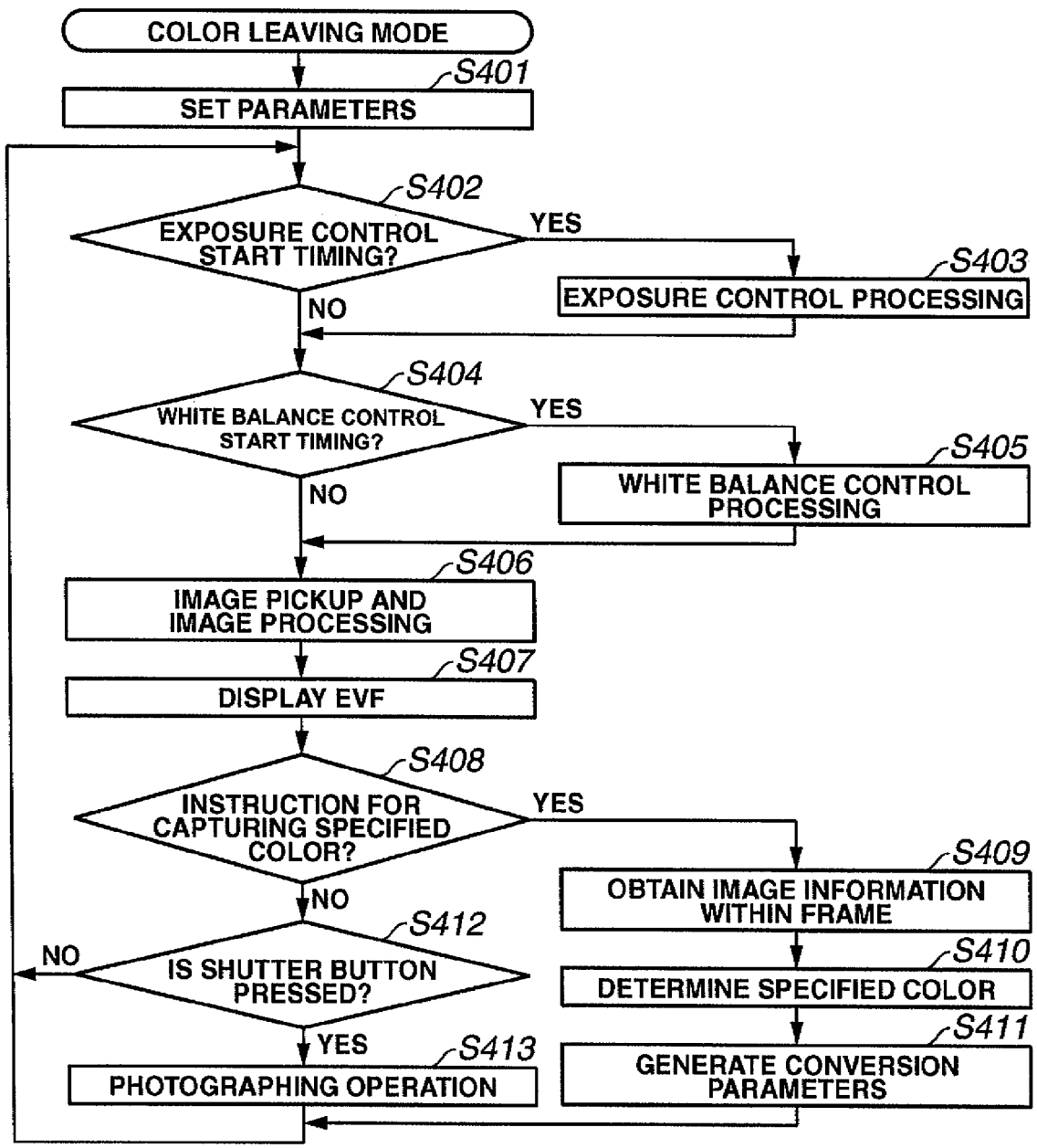
FIG. 4 is a flow chart that shows a method of processing to be carried out in a color leaving mode according to a first embodiment of the present invention.

FIG. 4 is a flow chart that explains processing operation of the digital camera of this embodiment at the time of photographing in the color leaving mode. The memory 120 stores therein the programs for executing the flow chart in FIG. 4, and the system control section 109 executes the operation of the programs. Note that there is no difference of operations carried out in the photographing mode other than the color leaving mode from the operations in a common digital camera, and accordingly, the explanation is made only as to the color leaving mode hereinbelow.

When a user sets the photographing mode of the digital camera to the color leaving mode, in step S401, previous setting parameters that have been set in the previous color leaving mode are set as the parameters of the color conversion processing section 311. In step S402, the system control section 109 determines whether an exposure control start timing has come. If it is determined that the exposure control start timing has come, the exposure control section 111 carries out exposure processing in step S403. The exposure processing is the setting of exposure for displaying an image on the EVF screen. Frequent performance of the exposure processing causes flickering of an image displayed on the screen, and therefore a time constant is set so that the exposure processing is set to be performed at a certain time interval. For example, the exposure processing is performed once in every two seconds. Accordingly, the result of the determination in step S402 becomes positive at this interval, and then, exposure control is carried out in step S403.

Next, in step S404, the system control section 109 determines whether a white balance control start timing has come. If it is determined that the white balance control start timing has come, processing proceeds to step S405. In step S405, white balance processing is performed. Just as in the case of exposure processing, frequent performance of the white balance processing causes flickering of an image displayed on the screen, and therefore a time constant is set so that the white balance processing is performed at a certain time interval. For example, the white balance processing is set to be performed once in every five seconds. In the white balance processing, a white balance coefficient for performing the white balance processing is computed, and the white balance coefficient used by the image processing section 110 is updated.

In step S406, an image is photographed with an aperture value set by the exposure control in step S403, and the image processing section 110 carries out image processing on a through image that is a real-time output from the image pickup element 103 by using the white balance coefficient set in step S405. Then, in step S407, the image data that has undergone the image processing in step S406 is displayed on the LCD 204 (the image display section 116) that functions as the EVF screen.

The EVF screen 801 as shown in FIG. 8 is displayed on the LCD 204. As shown in FIG. 8, in the color leaving mode, the EVF screen 801, a color capture frame 802, and a specified color display frame 803, which are located within the EVF screen 801, are displayed on the LCD 204. Thus, it is possible to perform setting of the specified color by performing given operations of the operation section 129 (steps S408 through S410) and to take an image by operation of the shutter button 203 (steps S412 and S413).

In this regard, first, an explanation is made as to how the specified color is set. The user, in order to specify the specified color, determines the direction of the camera, operates an optical zooming, and sets a field angle so that the desired color is fully included in the color capture frame 802. When the left button of the cross-shaped button 209 is pressed, it is determined that an instruction for capturing the specified color is inputted, and then processing proceeds from step S408 to step S409. In step S409, pixel data of the image that is currently present within the color capture frame 802 is obtained. In step S410, arithmetic operation is carried out to average the obtained pixel data, and the obtained image data that is averaged is determined as the specified color. When the specified color is determined, a patch indicating the specified color is displayed in the specified color display frame 803.

Note that in computing the average pixel value within the color capture frame 802 in step 410, the pixel data used therein may be image data that is subjected to thinning for display on the electronic viewfinder (the image data stored in the image display memory 113), or may be image data that is stored in the memory 114.

When the specified color is determined in step S410, processing proceeds to step S411. In step S411, conversion parameters for leaving the specified color only and eliminating the other color signals are determined. In this embodiment, as described with reference to FIG. 9 and the like above, the parameters are determined so that the signal values of the lattice points that form the cubic lattice including the specified color in the three-dimensional lookup table are not changed, and all the U and V signals of the other lattice points are set to be zero. That is, a luminance Y is not changed, as shown in FIG. 13, with respect to the colors other than the specified color and the color of the values of the lattice points included within the cubic lattice that includes therein the specified color, and consequently, the image data is reproduced in a monochromatic tone except the specified color. Then, in step S411, the three-dimensional lookup table of the color conversion processing section 311 is updated. Thus, when processing returns to step S402 to perform an ordinary photographing operation, the updated lookup table is applied to images captured thereafter from the image pickup element 103 (step S406), and the image display for the EVF screen is carried out (step S407). Then, when an image is ordinarily photographed, the three-dimensional lookup table that is updated by the color conversion processing section 311 is used in the image processing by the image processing section 110 in photographing an image (steps S412 and S413). Note that in photographing an image, as described above, the signal SW1 is produced in a state where the shutter button 203 is half-pressed, then the processing operations for image taking, such as the automatic focus (AF) processing, the automatic exposure (AE) processing, the automatic white balance (AWB) processing, the preliminary emission of flash (EF) processing, and the like, are performed. Then, the user fully presses the shutter button 203, and in this state, the signal SW2 is produced. Thereby, a series of image taking processing operations is carried out. With the series of image taking processing operations, image data that has undergone the image processing, in which the specified color thereof that has undergone the image processing by the image processing section 110 is left and the other colors thereof are changed into a monochromatic tone reproduction (gray scale), is subjected to the compression processing by the compression/expansion section 115, and then is recorded on the recording medium 122 or the recording medium 123. In the color leaving mode, it may control only to take a picture of the color leaving after the designated color is decided. Hereby, the color leaving mode operation is made easier.

Note that even in the color leaving mode, it is possible to perform an ordinary image taking operation unless the specified color is captured and the parameters for the color leaving mode are not produced, and thus, the user does not miss a moment for a good image.

Further, the three-dimensional lookup table for use in the color leaving mode that has been produced is stored in the non-volatile memory 124, and thus, the produced three-dimensional lookup table is effective in the next photographing occasion even after the power of the camera is turned off. Therefore, it is possible to continue shooting with the same color leaving effect even if the setting is not performed again using the color leaving mode.

Note that in this embodiment, an explanation is made as to an example of the case where only one specified color is set. However, the configuration of this embodiment is not limited to this. That is, the configuration may be such that a plurality of colors desired to be left can be set at the same time.

In addition, in this embodiment, the left button of the cross-shaped button 209 is used in capturing a specified color. However, the configuration of this embodiment is not limited to this. That is, the function for capturing a specified color may be assigned to any other button, or a dedicated button may be provided, as a matter of course.

In this embodiment, the color capture frame displayed on the EVF screen when the specified color is being captured is fixed in the vicinity of the central portion of the screen. However, the color capture frame may be configured to be able to move to an arbitrary position within the EVF screen, as freely instructed by the user. In addition or alternatively, the color capture frame may be configured so that the size thereof can be varied as freely instructed by the user.

Also, in this embodiment, the three-dimensional lookup table processing and the interpolation arithmetic operation processing are used for arithmetic operation processing by the color conversion processing section 311. However, the configuration of this embodiment is not limited to this. That is, as long as the three-dimensional lookup table is supplied with all the necessary signal values, the interpolation arithmetic operation processing is not necessary. In addition, if a matrix arithmetic operation processing is a processing that is capable of setting the color signals of the colors other than the specified color to be zero, the matrix arithmetic operation processing in which coefficients for matrix arithmetic operation are changed for each color space, for example, may be used.

Here, processing using the matrix arithmetic operation processing is briefly explained. In the above-described embodiment, the values of Y, U, and V signals after being subjected to conversion are set on each of the lattice points as shown in FIG. 9. However, in the processing using the matrix arithmetic operation processing, coefficients M11 through M33 of equation (16) as described below are stored in each of the lattice points. The coefficients M11 through M33 are determined in accordance with signals Yin, Uin, and Vin. Then, the arithmetic operation as expressed by equation (16) is carried out to obtain signals Yout, Uout, and Vout. Here, the coefficients M11 through M33 may be obtained and determined in accordance with the coefficients stored in the lattice point that is located at a position closest to the signals Yin, Uin, and Vin, or in accordance with the result of interpolation arithmetic operation in relation to each of the lattice points, as in the above-described embodiment.

$$\begin{vmatrix} Yout \\ Uout \\ Vout \end{vmatrix} = \begin{vmatrix} M11 & M12 & M13 \\ M21 & M22 & M23 \\ M31 & M32 & M33 \end{vmatrix} \begin{vmatrix} Yin \\ Uin \\ Vin \end{vmatrix} \quad (16)$$

Second Embodiment

In the first embodiment of the present invention, the exposure processing and the white balance processing are, respectively, simply carried out at time intervals determined by the given time constants (steps S402 through S405). In the second embodiment, at the time of capturing an image for determination of a specified color (step S409), the white balance processing and the exposure control processing that are different from those in the case of the ordinary image taking operation are performed. Thus, the exposure and the white balance at the time of capturing a specified color are more appropriately controlled, so that capturing of the specified color with higher accuracy is implemented.

Figure 10:
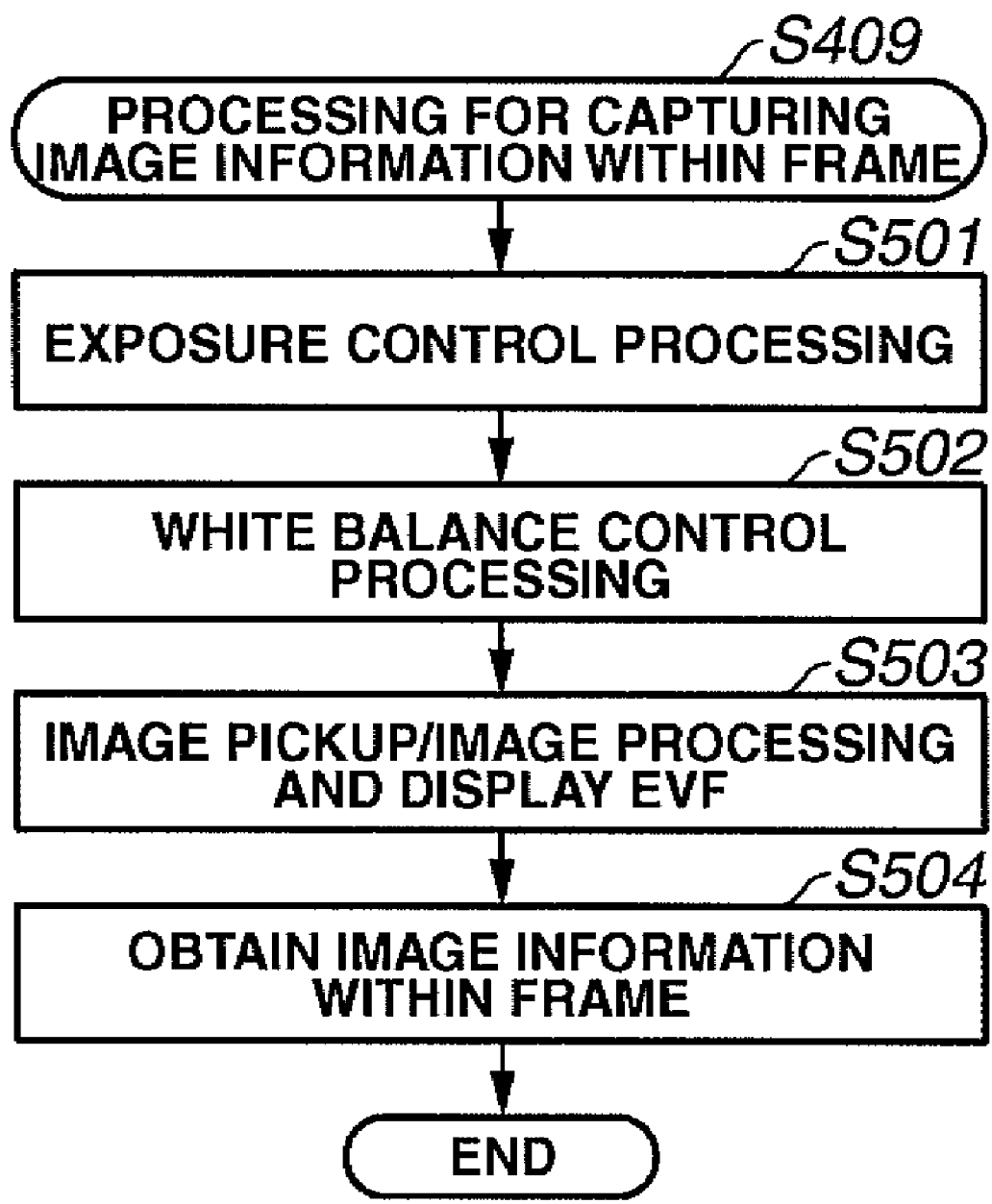
FIG. 10 is a flow chart that shows a method of processing in a color leaving mode according to a second embodiment of the present invention.

Hereinbelow, a configuration of the second embodiment that is different from the configuration of the first embodiment is explained. In the second embodiment, in the color capturing processing in step S409 as described in the first embodiment, the exposure control processing and the white balance processing are carried out. FIG. 10 is a flow chart that explains the operation of capturing image information of an image within the color capture frame 802 according to the second embodiment. FIG. 10 shows processing equivalent to the processing in step S409 as shown in FIG. 4, as described with respect to the first embodiment. Hereinbelow, a detailed explanation is made as to the second embodiment with reference to FIG. 10.

When the left button of the cross-shaped button 209 is pressed, it is determined that an instruction for capturing a specified color is inputted, and then processing proceeds from step S408 to step S409. In step S409, processing operations shown in steps S501 through S504 are carried out.

In this regard, first, the same exposure control processing as the processing in step S403 is carried out in step S501. In step S502, the same white balance processing as the processing in step S405 is carried out. In the exposure control processing, an exposure is determined, and then, an aperture value and a shutter speed are determined on the basis of the determined exposure (step S501). The image pickup apparatus carries out image taking with the determined aperture value and shutter speed, and also carries out the white balance processing on the basis of the photographed image data (step S502).

After that, processing proceeds to step S503. In step S503, image taking is carried out with the setting of the exposure mentioned above. The image processing section 110 carries out image processing including the white balance processing using the white balance coefficients that are determined by the white balance control processing, and after that, allows the result of the image processing to be displayed on the EVF screen. Then, in step S504, pixel data within the color capture frame 802 is obtained from an image that is used for display (an image that is stored in the image display memory 113 or the memory 114) on the EVF screen in step S503. In step S410, a specified color is determined by using the pixel data obtained through the processing operations carried out in steps S501 through S504.

As described above, in the second embodiment, one difference from the first embodiment is that the exposure processing and the white balance processing are carried out at the time of determination of a specified color. That is, in the first embodiment, when the left button of the cross-shaped button 209 is pressed, pixel values within the color capture frame 802 are averaged by using the image data that is currently displayed on the EVF screen to determine a specified color. On the other hand, in the second embodiment, when the left button of the cross-shaped button 209 is pressed, the exposure control processing and the white balance control processing are carried out again, and the average value of pixel values within the color capture frame 802 is computed and obtained by using an image that have been photographed and undergone the image processing in accordance with the settings set by the exposure control processing and the white balance control processing.

Further, in the second embodiment, in determining a specified color, an image photographed after the exposure is adjusted and controlled to be at an appropriate level is used. Therefore, in the second embodiment, the specified color can be determined by using an image that is captured with an appropriate brightness, and further, the user can capture the specified color with higher accuracy.

In addition, in the second embodiment, in determining a specified color, parameters of the white balance processing section 301 are appropriately set before an image that is processed by the image processing section 110 is used. It is therefore possible to capture a specified color in an appropriate color level, and thus the user can capture the specified color with higher accuracy.

Third Embodiment

Hereinbelow, a description is provided of a third embodiment of the present invention. As described above, the image pickup apparatus has two different modes, namely, an ordinary photographing mode and a color leaving mode in which a specified color is set and color signals of the colors other than the specified color are eliminated. In the third embodiment, the interval for performing the exposure control processing and the interval for performing the white balance processing are set to be different between the color leaving mode and the ordinary photographing mode. That is, the interval for performing the exposure control processing and the interval for performing the white balance processing in the case of the color leaving mode are set to be shorter than those in the case of the ordinary photographing mode.

Note that the processing in the ordinary photographing mode is equivalent to the processing shown in FIG. 4, except for the portion of the processing related to color conversion, namely, except for the processing performed in steps S408 through S411. That is, when the ordinary photographing mode is set, an exposure is determined first. When the exposure setting is determined, an aperture value and a shutter speed are determined on the basis of the determined exposure. Then, the determined aperture value and the determined shutter speed are set as an aperture value and a shutter speed, respectively, in the image pickup apparatus of this embodiment. The exposure control carried out in this case is the exposure control of an image to be displayed on the EVF screen. In this regard, a frequent change of the exposure control causes flickering of an image displayed on the screen, and in order to prevent this, a time constant is set with respect to the exposure control processing. For example, the time constant is set so that the exposure control processing is carried out, for example, once in every two seconds (steps S402 and S403). Next, the white balance processing is carried out on the basis of data of an image photographed in accordance with the aperture value and the shutter speed that have been set. Just as in the case of the exposure control processing, a frequent change of the white balance control causes flickering of an image displayed on the screen. In order to prevent this, a white balance coefficient for performing white balance processing is computed, for example, once in every five seconds, and thus the white balance coefficient for use in image processing is updated (steps S404 and S405). Next, image taking is carried out, and the photographed image is displayed on the EVF screen after being subjected to image processing by the image processing section 110 (steps S406 and S407). When the user presses the shutter button, the image pickup apparatus of this embodiment carries out photographing operations (steps S412 and S413). If the user does not press the shutter button, processing returns to step S402.

Meanwhile, in the color leaving mode, it is necessary to capture a specified color with a higher color reproduction capability than in the case of the ordinary photographing mode, and accordingly, a time constant for the exposure control processing as in steps S402 and S403 in FIG. 4 is set to be shorter than the time constant in the case of the ordinary photographing mode. In addition, in the white balance control processing in steps S404 and S405 also, just as in the case of the exposure control processing, a time constant of the white balance control processing is set so that the white balance control processing is carried out at a time interval shorter than the time interval in the case of the ordinary photographing mode, namely, once in every one second, for example. In addition, the setting is performed so that a white balance coefficient is computed and the white balance coefficient is updated. Although the amount of flickering of an image displayed on the EVF screen caused in the color leaving mode thereby becomes larger than in the case of the ordinary photographing mode, the exposure and the white balance are always set to be in an appropriate level, and therefore, it is possible to set a specified color with a higher accuracy.

Figure 11:
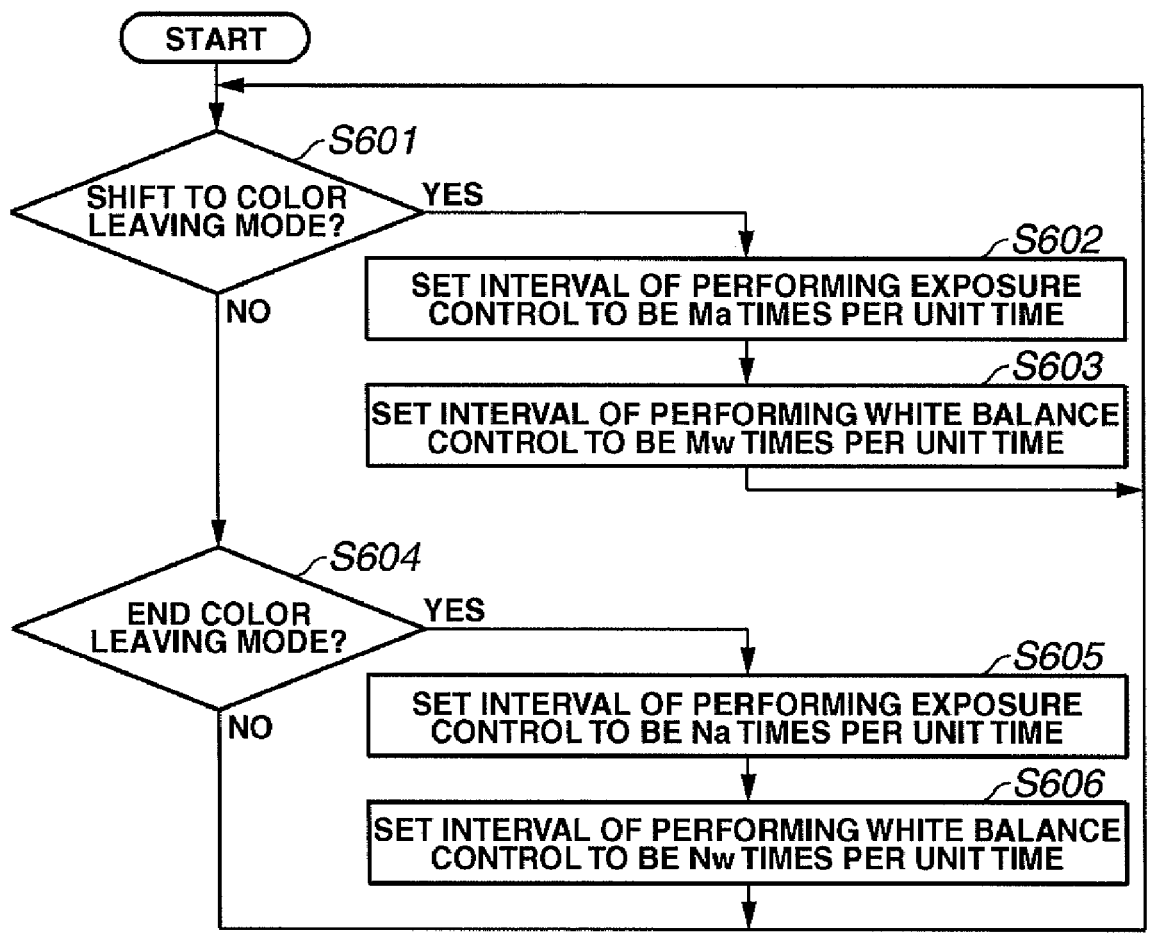
FIG. 11 is a flow chart that shows a method for performing an exposure control and a white balance control during an operation of a color leaving mode according to a third embodiment of the present invention.

In order to implement the operations according to this embodiment as described above, the system control section 109 carries out processing as shown in FIG. 11. In the processing shown in FIG. 11, first, in step S601, it is determined whether the photographing mode is shifted to the color leaving mode or not. If it is determined that the photographing mode is shifted to the color leaving mode, processing proceeds to step S602. In step S602, the interval for performing the exposure control is set to be Ma times per unit time (in the example as described above, once in every one second). Further, processing proceeds to step S603, where the interval for performing the white balance control processing is set to be Mw times per unit time (in the example as described above, once in every one second). On the other hand, if the color leaving mode ends, that is, if the photographing mode returns to the ordinary photographing mode, for example, processing proceeds from step S604 to step S605. In step S605, the interval for performing the exposure control is set to be Na times per unit time (in the example as described above, ½ time in every one second). Further, processing proceeds to step S606, where the interval for performing the white balance control processing is set to be Nw times per unit time (in the example as described above, ⅙ time in every one second).

As described above, in a case where the number of times of performance of the exposure control operation during the display of an image on the EVF screen in the case of the ordinary photographing mode per unit time is Na and the number of times of performance of the exposure control operation during the display of an image on the EVF screen in the case of the color leaving mode per unit time is Ma, a relation of Na<Ma can be set. According to this setting, an image at the time of color capturing thereof in the color leaving mode can be previewed with a more appropriate exposure. Thus, the user can more easily capture a specified color with a higher accuracy.

That is, it is possible to capture a specified color with an appropriate exposure corresponding to the variance or change in the place where an image is taken, the time at which an image is taken, and an environmental illuminance under which an image is taken, by making the time taken to perform the exposure control operation in color capturing in the color leaving mode shorter than the time taken to perform the exposure control operation in the ordinary photographing mode.

In addition, in a case where the number of times of performance of the white balance control operation during the display of an image on the EVF screen in the case of the ordinary photographing mode per unit time is Nw and the number of times of performance of the white balance control operation during the display of an image on the EVF screen in color capturing in the case of the color leaving mode per unit time is Mw, a relation of Nw<Mw can be set. According to this setting, an image at the time of color capturing thereof can be previewed with a more appropriate exposure. Thus, the user can more easily capture a specified color with a higher accuracy.

Note that in the second embodiment as described above, an AE photometry of the exposure control at the time of capturing an image used for determining the color leaving mode is performed by the same evaluation photometry using the whole part of the image as in the case of the ordinary photographing mode. However, in a case where the regions other than the inside of the color capture frame of an image are extremely dark or bright, it is sometimes the case with the evaluation photometry using the whole part of the image that a specified color within the color capture frame cannot be captured with an appropriate brightness. In order to prevent this from occurring, in carrying out the exposure control processing of step S501 shown in FIG. 10, the exposure control may be performed by changing the type of photometry to a spot photometry so that the luminance within the color capture frame is at an appropriate level. With this configuration, the luminance within the color capture frame 802 can be more appropriately controlled.

Note that in the second embodiment, it has been explained that the exposure control processing and the white balance control processing are carried out at the time of capturing a specified color in the case of the color leaving mode. However, in this regard, automatic focus processing may also be performed at the time of capturing a specified color in the same way. However, in capturing a specified color in the case of the color leaving mode, the accuracy of the automatic focusing may be lowered in order to carry out the color capturing at a high speed. The lowering of the accuracy of the automatic focusing may be effected by setting a driving step width of a focusing lens for obtaining an evaluation signal for determining a focusing position to be greater than a driving step width in the case of the ordinary photographing mode.

Figure 14:
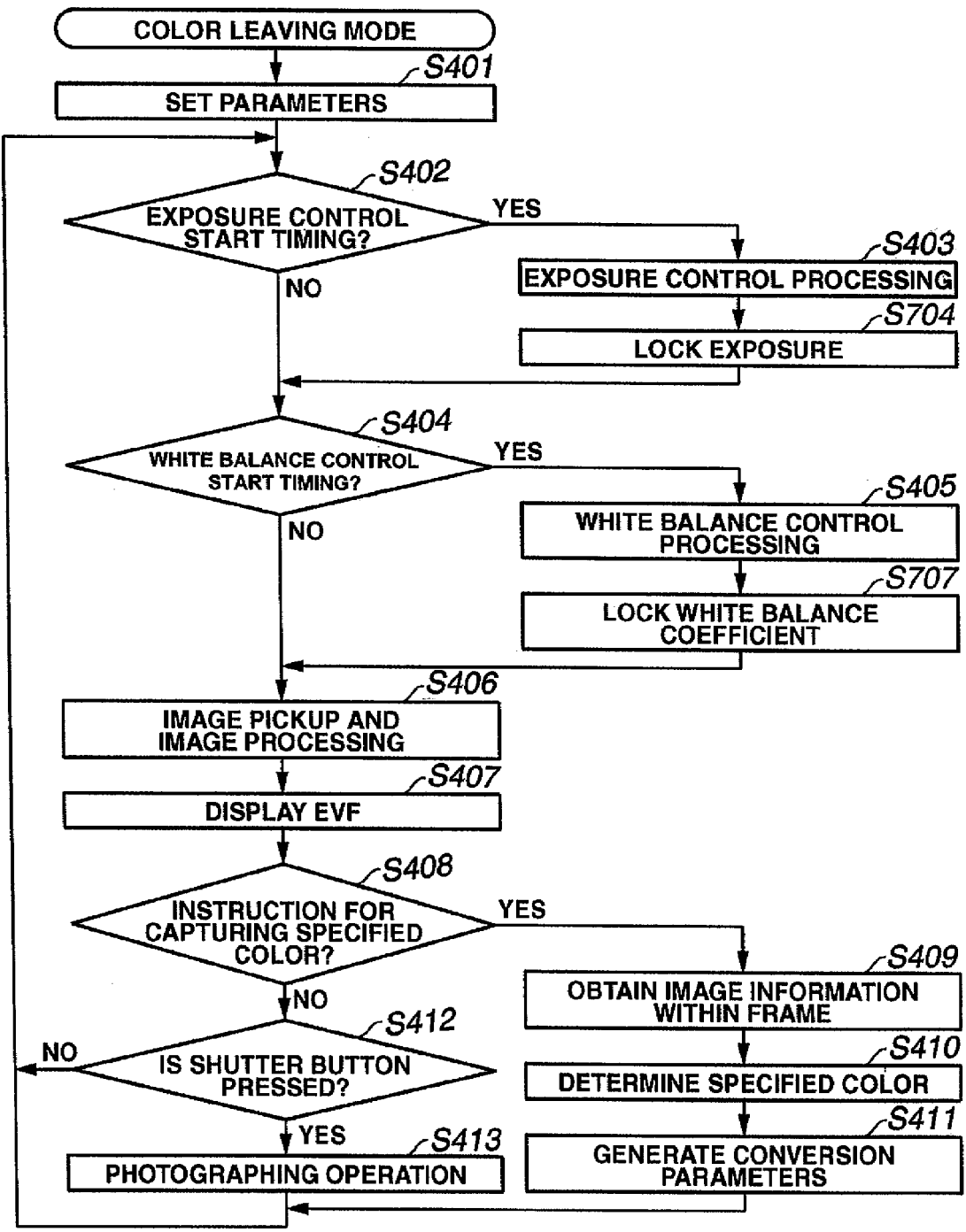
FIG. 14 is a flow chart that shows an operation at the time of fixing an exposure and an operation at the time of fixing a white balance coefficient in the color leaving mode according to the first embodiment of the present invention.

Further, in a case where the exposure and the white balance at the time of capturing of a specified color and the exposure and the white balance at the time of main exposure photographing are mutually different by a large amount, there is a case where an image with a specified color left as desired by the user cannot be taken. In this regard, as shown in FIG. 14, photographing operations in step S406 and thereafter may be carried out in a state in which an auto-exposure (AE) lock switch is operated (step S704) and a white balance (WB) lock switch is operated (step S707).

Further, with regard to the WB lock, in a case where a white-paper white balance is set that uses a white balance control value obtained by previously capturing an achromatic subject in a color of white and the like (a white image) and by performing computation based on the captured image of the achromatic subject, a specified color may be captured while locking (fixing) white balance with the white-paper white balance control value. In addition, exposure compensation may be prohibited so that the exposure at the time of capturing a specified color and the exposure at the time of main exposure photographing are not mutually different.

As described above, according to exemplary embodiments of the present invention, a specified color can be determined by actually capturing the specified color with a digital camera. Thereby, it is possible, in performing an image pickup operation, to readily obtain an image subjected to a special effect in which a color specified by the user is left and color components of the colors other than the specified color are converted into specific color component values.

Other Embodiments

Note that in the embodiments of the present invention as described above, parameters for converting color component values of the colors other than the specified color into values indicating the achromatic color (i.e., gray scale) are determined. However, the color component values of the colors other than the specified color are not limited to be converted into the achromatic color but may be converted into color component values of another chromatic color. That is, the luminance value Y is not changed to sustain the tone reproduction as it is, and colors other than the specified color are represented by a specific chromatic color.

Each unit that configures an image pickup apparatus of an exemplary embodiment of the present invention and each step of an image pickup method of an exemplary embodiment of the present invention as described above may be implemented by executing a program stored in a RAM, a ROM, and the like of a computer. The present invention includes the program and a computer-readable storage medium on which the program is recorded.

In addition, the present invention may be implemented as a system, an apparatus, a method, a program, a storage medium, or the like, for example. More specifically, the present invention may be applied to a system configured by a plurality of devices or may be applied to an apparatus configured by one single device.

Note that the present invention may also be provided by supplying a software program that implements the functions of the above embodiments to a system or an apparatus, directly or from a remote place, and by causing a computer of the system or the apparatus to read and execute the supplied program code.

Accordingly, the program code that is installed into the computer in order to achieve the functions and the processing of the present invention implements the present invention. That is, the present invention includes a computer program for implementing the functions and the processing of the present invention.

In this case, the program may be of the form of object code, a program executed by an interpreter, script data to be supplied to an OS, and the like, as long as it is provided with a program function.

A recording medium for supplying the program includes, for example, a floppy (registered trademark) disk, a hard disk, an optical disk, a magneto-optical disk, an MO, a CD-ROM, a CD-R, a CD-RW, a magnetic tape, a non-volatile memory card, a ROM, a DVD (DVD-ROM, DVD-R), and the like.

In addition, the above program can also be supplied by connecting to a website on the Internet using a browser of a client computer and by downloading, from the website to a recording medium such as a hard disk and the like, the computer program itself or a compressed file including an automatic installation function.

Alternatively, the functions of the above embodiments can also be implemented by dividing program code that configures a program according to the present invention into a plurality of files and by downloading each divided file from different web pages. That is, a WWW server for allowing a plurality of users to download program files for implementing the functions and processing of the embodiments configures the present invention.

The above program can also be implemented by distributing a storage medium such as a CD-ROM and the like that stores the program after encryption thereof, by having a user who is qualified for a prescribed condition download key information for decoding the encryption from a website via the Internet, and by executing and installing in a computer the encrypted program code using the key information.

In addition, the functions according to the embodiments described above are implemented not only by executing the program read by the computer, but also implemented by the processing in which an OS or the like running on the computer carries out a part of or the whole of the actual processing on the basis of instructions given by the program.

Further, after the program thus obtained is written in a memory within an image pickup apparatus via a recording medium or in a state where the image pickup apparatus is connected to a computer, a part of or the whole of the actual processing is carried out to implement the functions of the embodiments of the present invention as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image pickup apparatus comprising:
an image pickup unit;
an image processing unit configured to process an image signal obtained by the image pickup unit;
a recording unit configured to record the image signal that is outputted from the image processing unit;
a display unit configured to display on an electronic viewfinder screen an image based on the image signal that is picked up by the image pickup unit and outputted from the image processing unit;
a color determination unit configured to determine a color value based on color information included in a predetermined region of an image that is being displayed on the electronic viewfinder screen;
a color conversion parameter determination unit configured to determine color conversion parameters for leaving the color value determined by the color determination unit and converting a color component value included in the image signal other than the color value into a predetermined color value;
an inputting unit configured to input an instruction for causing the color determination unit to start determining the color value; and an execution unit configured to execute an exposure control to appropriately set an exposure of the image pickup unit when the instruction is inputted by the inputting unit, wherein the image signal is processed by the image processing unit based on the parameters determined by the color conversion parameter determination unit and the processed image is displayed by the display unit, and wherein the color determination unit does not determine the color value using an image picked up by the image pickup unit before the exposure control is executed by the execution unit.

2. The image pickup apparatus according to claim 1, further comprising:
an image pickup instruction unit configured to generate an image pickup instruction; and
a storage unit configured to, responsive to the image pickup instruction generated by the image pickup instruction unit, store on a storage medium the image signal processed by the image processing unit based on the parameters.

3. The image pickup apparatus according to claim 1, wherein the display unit displays the predetermined region used in the color determination unit as a frame on the electronic viewfinder screen.

4. The image pickup apparatus according to claim 3, further comprising:
a frame setting unit configured to allow a user to set a position and a size of the frame corresponding to the predetermined region.

5. The image pickup apparatus according to claim 1, wherein the display unit displays a patch image having the color value at a predetermined position as well as on the electronic viewfinder screen.

6. The image pickup apparatus according to claim 1, wherein the color conversion parameter determination unit determines color conversion parameters for converting the predetermined color value into a value that indicates an achromatic color.

7. The image pickup apparatus according to claim 1, wherein the color conversion parameter determination unit determines color conversion parameters for converting a U value and a V value of each lattice point other than a lattice point corresponding to the color value or lattice points in the vicinity of the color value, among lattice points that are set within a YUV color space, into zero.

8. An image pickup apparatus comprising:
an image pickup unit;
an image processing unit configured to process an image signal obtained by the image pickup unit;
a recording unit configured to record the image signal that is outputted from the image processing unit;
a display unit configured to display on an electronic viewfinder screen an image based on the image signal that is picked up by the image pickup unit and outputted from the image processing unit;
a color determination unit configured to determine a color value based on color information included in a predetermined region of an image that is being displayed on the electronic viewfinder screen;
a color conversion parameter determination unit configured to determine color conversion parameters for leaving the color value determined by the color determination unit and converting a color component value included in the image signal other than the color value into a predetermined color value;
an inputting unit configured to input an instruction for causing the color determination unit to start determining the color value; and
an execution unit configured to execute an exposure control to appropriately set an exposure of the image pickup unit when the instruction is inputted by the inputting unit, wherein the image signal is processed by the image processing unit based on the parameters determined by the color conversion parameter determination unit and the processed image is displayed by the display unit, and wherein the color determination unit determines the color value using an image picked up by the image pickup unit after the exposure control is executed by the execution unit.

9. The image pickup apparatus according to claim 8, further comprising:
an image pickup instruction unit configured to generate an image pickup instruction; and
a storage unit configured to, responsive to the image pickup instruction generated by the image pickup instruction unit, store on a storage medium the image signal processed by the image processing unit based on the parameters.

10. The image pickup apparatus according to claim 8, wherein the display unit displays the predetermined region used in the color determination unit as a frame on the electronic viewfinder screen.

11. The image pickup apparatus according to claim 10, further comprising:
a frame setting unit configured to allow a user to set a position and a size of the frame corresponding to the predetermined region.

12. The image pickup apparatus according to claim 8, wherein the display unit displays a patch image having the color value at a predetermined position as well as on the electronic viewfinder screen.

13. The image pickup apparatus according to claim 8, wherein the color conversion parameter determination unit determines color conversion parameters for converting the predetermined color value into a value that indicates an achromatic color.

14. The image pickup apparatus according to claim 8, wherein the color conversion parameter determination unit determines color conversion parameters for converting a U value and a V value of each lattice point other than a lattice point corresponding to the color value or lattice points in the vicinity of the color value, among lattice points that are set within a YUV color space, into zero.

15. The image pickup apparatus according to claim 8, wherein the color determination unit determines the color value using an image outputted from the image processing unit after the parameter for white balance processing is appropriately set by the execution unit.

16. A method of controlling an image pickup apparatus, the method comprising:
an image pickup step of converting light from a subject into an image signal using an image pickup element;
an image processing step of processing the image signal obtained in the image pickup step;
a display step of displaying on an electronic viewfinder screen an image based on the image signal that is picked up in the image pickup step and outputted in the image processing step;

a color determination step of determining a color value based on color information included in a predetermined region of an image that is being displayed on the electronic viewfinder screen;

a color conversion parameter determination step of determining color conversion parameters for leaving the color value determined in the color determination step and converting a color component value included in the image signal other than the determined color value into a predetermined color value;

a control step of processing the image signal in the image processing step based on the parameters determined in the color conversion parameter determination step and of displaying the processed image signal in the display step;

an inputting step of inputting an instruction for starting determining the color value in the color determination step; and an execution step of executing an exposure control to appropriately set an exposure of the image pickup element when the instruction is inputted in the inputting step, wherein in the color determination step, the color value using an image picked up by the image pickup unit before the exposure control is executed by the execution unit is not determined.

17. A storage medium storing a control program, which when loaded into a computer causes the computer to execute the method according to claim 16.

18. A method of controlling an image pickup apparatus, the method comprising:

an image pickup step of converting light from a subject into an image signal using an image pickup element;

an image processing step of processing the image signal obtained in the image pickup step;

a display step of displaying on an electronic viewfinder screen an image based on the image signal that is picked up in the image pickup step and outputted in the image processing step;

a color determination step of determining a color value based on color information included in a predetermined region of an image that is being displayed on the electronic viewfinder screen;

a color conversion parameter determination step of determining color conversion parameters for leaving the color value determined in the color determination step and converting a color component value included in the image signal other than the determined color value into a predetermined color value;

a control step of processing the image signal in the image processing step based on the parameters determined in the color conversion parameter determination step and of displaying the processed image signal in the display step;

an inputting step of inputting an instruction for starting determining the color value in the color determination step; and an execution step of executing an exposure control to appropriately set an exposure of the image pickup element when the instruction is inputted in the inputting step, wherein in the color determination step, the color value using an image picked up by the image pickup unit after the exposure control is executed by the execution unit is determined.

19. A storage medium storing a control program, which when loaded into a computer causes the computer to execute the method according to claim 18.

* * * * *